United States Patent
Brooks

[15] 3,678,434
[45] July 18, 1972

[54] TEMPERATURE SENSING DEVICE FOR ROOM AIR TEMPERING APPARATUS

[72] Inventor: Robert E. Brooks, Worthington, Ohio
[73] Assignee: Ranco Incorporated, Columbus, Ohio
[22] Filed: July 22, 1970
[21] Appl. No.: 57,104

[52] U.S. Cl. .................338/196, 73/343 R, 73/362 AR, 338/197, 338/199
[51] Int. Cl. .............................................H01c 1/02
[58] Field of Search ............116/115; 338/196, 197, 199; 73/343 R

[56] References Cited

UNITED STATES PATENTS

| | | | |
|---|---|---|---|
| 1,320,120 | 10/1919 | Brown et al. | 338/196 |
| 2,746,417 | 5/1956 | McCord | 116/115 |
| 2,740,027 | 3/1956 | Budd et al. | 338/197 |

Primary Examiner—Louis R. Prince
Assistant Examiner—Denis E. Corr
Attorney—Watts, Hoffmann, Fisher & Heinke

[57] ABSTRACT

An adjustable temperature sensing device for controlling the operation of a room air tempering apparatus includes a potentiometer supported on a frame and which is adjusted by rotating a hollow cylindrical member which surrounds the potentiometer and is journalled in an abutment on the frame. The device includes a cover having an opening which exposes a portion of the cylindrical member by which the member is manually engaged for rotation. The cover has a second opening extending alongside another cylindrical portion of the adjusting member which exposes a small segment of a spiral indicator on the exterior of the adjusting member for indicating the setting of the potentiometer.

1 Claim, 7 Drawing Figures

PATENTED JUL 18 1972 3,678,434

INVENTOR.
ROBERT E. BROOKS
BY
Watts, Hoffmann, Fisher & Heinke
ATTORNEYS

PATENTED JUL 18 1972

INVENTOR.
ROBERT E. BROOKS
BY

*Watts, Hoffmann, Fisher & Heinke*
ATTORNEYS

TEMPERATURE SENSING DEVICE FOR ROOM AIR TEMPERING APPARATUS

BACKGROUND OF THE INVENTION

It is well known to provide thermostatic switches in a room for controlling electrical circuits of air tempering apparatus to maintain comfortable air conditions in the room. Such devices generally comprise a base, attachable to a wall of the room, and a cover. A thermometer is frequently provided which indicates actual temperature of the room, an adjusting member for setting the condition to be maintained, such as temperature, and means for indicating the setting of the adjusting member. The thermostatic switch comprises an electrical contact make and break arrangement actuated by a thermally sensitive power element.

More recently developed control systems for air tempering apparatus have eliminated the thermostatically operated contact making and breaking type switching mechanisms and instead utilize electronic circuits which include bridge circuits having at least one thermistor type resistance balanced by a potentiometer. Temperature settings are altered by changing the setting of the potentiometer. The present invention relates to a room air condition sensing device of the last mentioned type and comprising a potentiometer having a novel manual adjusting member and potentiometer setting indicator.

The present invention relates to a condition sensing device which comprises a potentiometer in a variable resistance type circuit for controlling the operation of an air tempering or conditioning apparatus for a room or building. The device is particularly suitable for attaching to the wall of a room the temperature of which is affected by the air tempering system. The device provides a convenient rotatable member for varying the resistance of the potentiometer, and means for indicating the setting of the potentiometer.

THE INVENTION

The present invention contemplates the provision of an air condition sensing device comprising a base structure adapted to be attached to a wall or the like, the structure supporting a potentiometer having a rotary adjustment part and a tubular cylindrical adjusting member surrounding the potentiometer and supported for rotation on an axis coincident with the axis of the potentiometer adjustment part, the adjusting member and potentiometer adjusting part being drivingly connected. Indicia extending in a spiral along the cylindrical sides of the adjusting member cooperates with scale means carried by the frame for indicating the setting of the potentiometer.

In the preferred form of the invention, the potentiometer is attached to an elongated circuit board which extends into one end of the cylindrical adjusting member with the potentiometer connected with the end wall at the opposite end of the member by a sliding connection.

RELATED CASE

The appearance of the air sensing device shown in the present application is the subject of a United States design application, Ser. No. D-22097, filed Mar. 30, 1970.

Other objects and advantages of the invention will be apparent from the following description of a preferred form thereof, reference being made to the accompanying drawings wherein.

Figure 1:
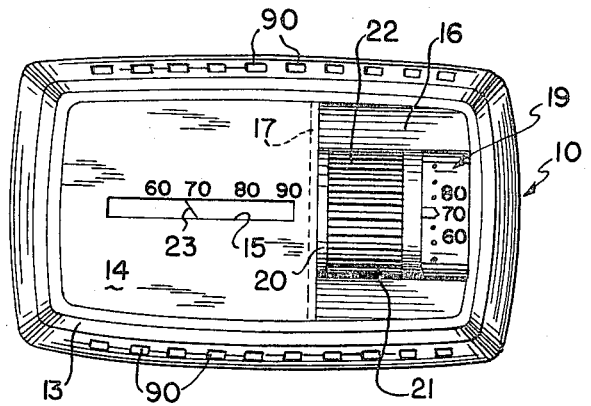
FIG. 1 is a front elevational view of an air temperature sensing device embodying the invention.
Figure 2:
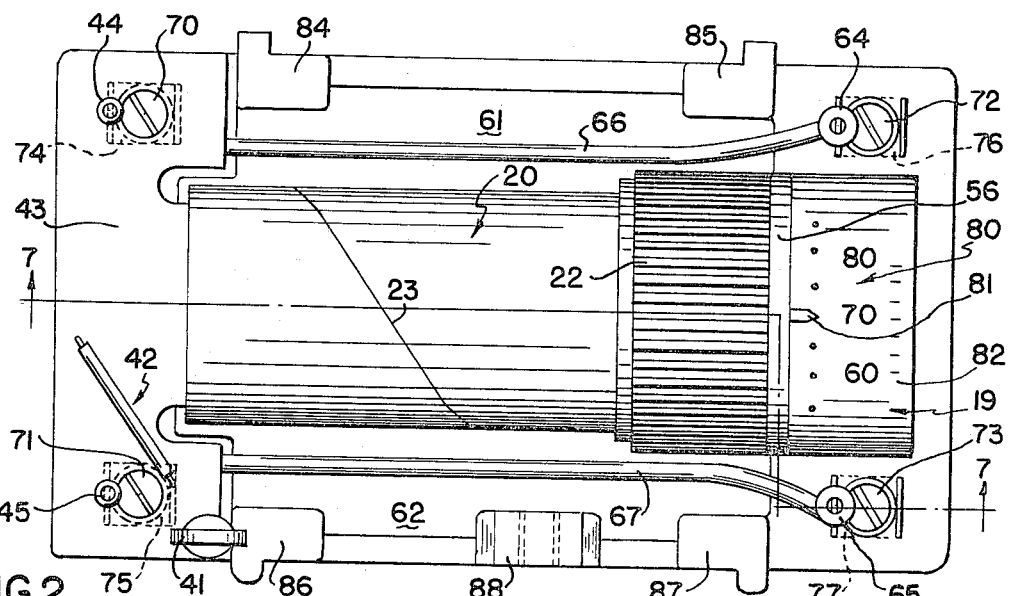
FIG. 2 is a front elevational view, on a larger scale, of the sensing device shown in FIG. 1 and having the cover thereof removed.
Figure 3:
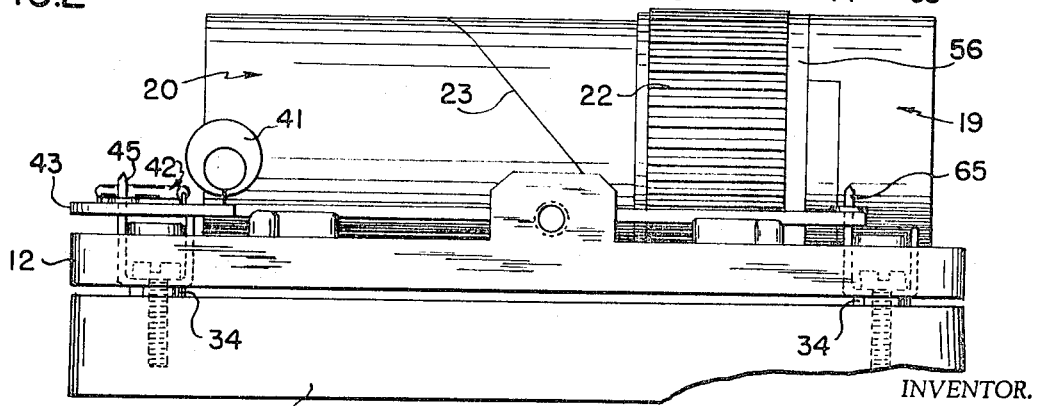
FIG. 3 is a side elevational view of the device shown in FIG. 2.
Figure 4:
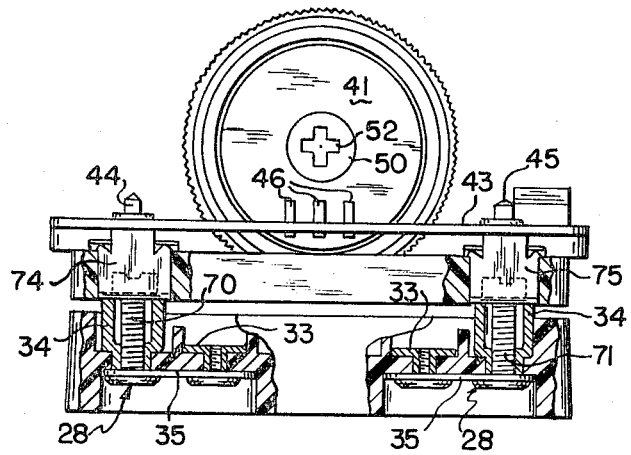
FIG. 4 is an end view of the device looking from the left-hand end of the device as viewed in FIG. 3.

An air temperature sensing device is shown at 10 which is adapted to affect the control circuit of a room air tempering apparatus, not shown, for maintaining a desired adjustable room temperature. FIG. 1 shows the device 10 as it would appear attached to the wall of a room. The device 10 comprises a base 11, a frame 12 and a cover 13. The base 11 is adapted to be more or less permanently attached to the room wall, and the frame 12 and cover 13 are assembled thereto. The cover 13 includes a front panel 14 having rearwardly extending side and end flanges which enclose the edges of the frame. One section of the panel 14 has a plane surface with an elongated, relatively narrow window 15 therein and extending horizontally. A concave section 16 is formed in the panel 14 adjacent the plane surface section and a forwardly extending wall 17 separates the two sections. A cylindrical temperature adjusting member 20 is rotatably supported on the frame 12 with its axis extending horizontally, as viewed in FIG. 1 so that a longitudinal portion of the outer walls thereof is visible through the window 15. One end section 21 of the adjusting member 20 extends through an opening through the wall 17 and into the recess formed by the concave section 16 of the panel 14 where it is accessible for manual rotation. The adjusting member 20 is rotatably supported and varies the adjustment of a potentiometer when rotated, as is described more fully hereinafter. Suffice to say, the section 21 of the member 20 has a knurled band 22 thereabout which forms an adjusting knob by which the adjusting member can be rotated by a person's finger.

The angular setting of the adjusting member 20 is indicated by a line 23 which appears to move longitudinally of the window 15, according to the angular rotation of the member by the knob 22. The line 23 cooperates with a temperature scale comprised of the numerals 60,70,80,90 which are appropriately located above the window 15 and indicate Fahrenheit temperatures. It will be appreciated that the temperature of the room may be altered by adjustment of the knob 22 to a position in which the line 23 is opposite the desired temperature indicated. A thermometer 19 is positioned adjacent the adjusting knob 22 for indicating actual temperature at the device 10.

Referring to the constructional details of the device 10, the base 11 comprises a rectangular, relatively flat, box-like member, preferably formed of a molded rigid dielectric material. The base is adapted to be secured to and across the open side of an electric junction box recessed in a room wall, neither of which are shown. The base 11 includes a rear wall 25 and forwardly projecting side and end walls extending from the edges of the wall. The wall 25 has sections 26,27 of increased thickness and which have openings to receive screws, not shown, for securing the base to the junction box. The central portion of the rear wall 25 of the base 11 has an opening 32 through which control circuit wires, not shown, are extended from the junction box and connected with terminal post assemblies 28 adjacent the four corners of the base. The four terminal post assemblies 28 are attached to the base at the sections 26,27 and only two appear in the drawing.

The terminal post assemblies 28 each includes a terminal block 33 and a terminal bushing 34 interconnected by a conductor plate 35. Each conductor plate 35 is positioned in a recess in the rearwardly facing surface of the wall 25 and is secured therein by the terminal block 33 and bushing 34. The block 33 and bushing 34 rest on the surfaces of the raised sections 26,27 as the case may be, and have stems which project through openings in the base wall 25 and which are suitably attached to the conductor plate 35 adjacent opposite ends. The terminal blocks 33 comprise square metal plates having a hollow stem. The plate and stem are threaded to receive terminal screws for connecting lead wires with the terminal blocks. The bushings 34 are of conducting metal and comprise hollow posts which are internally threaded to receive screws which attach the frame 12 to the base. The outer ends of the bushings 34 extend slightly and uniformly beyond the plane of the outer edges of the base and serve as supporting surfaces for the frame 12 when the frame is assembled with the base.

The frame 12 is comprised of a rectangular, relatively flat panel, preferably formed of a molded, rigid dielectric material. The outline of the frame corresponds to the outline of the base 11 and the frame is assembled to the base with the edges of the two members in registration. The frame 12 carries components of a temperature control circuit, the adjusting member 20 and the thermometer 19. The components of the circuit and the adjusting member 20 are assembled on the frame before the frame is attached to the base.

Figure 5:
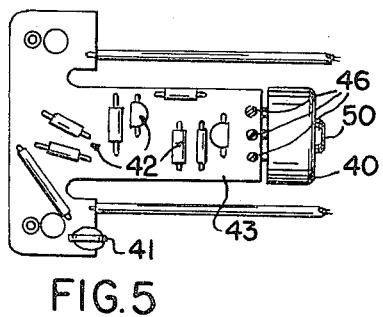
FIGS. 5 and 6 are elevational views of opposite sides of a component of the air sensing device shown in FIG. 1.
Figure 6:
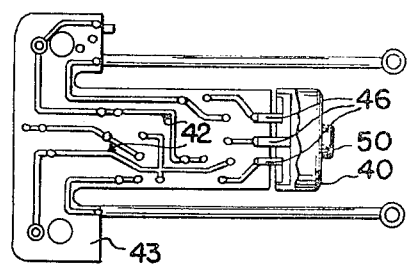

The control circuit components include a potentiometer 40, a thermistor 41, and conductors and resistors indicated generally by reference characters 42. The details of the circuit are unnecessary to an understanding of the invention and are not described. To simplify the disclosure, many of the conductors and resistors have been omitted from the drawings, except in FIGS. 5 and 6. Suffice to say the circuit components are mounted on a T-shape dielectric panel 43 which is attached at its broad end to terminal prongs 44,45 projecting forwardly from the frame 12. The panel 43 is relatively thin and the edges at the broad end thereof are shaped to conform to the edges of the frame 12 at the end from which the terminal prongs 44,45 project. The panel 43 has grommeted openings which receive the terminal prongs 44,45 therethrough when the panel is assembled to the frame with the stem section thereof projecting to overlie the central portion of the frame. The prongs and grommets are secured by solder so as to make mechanical and electrical connections. The grommets are electrically connected with the control circuit.

Figure 7:
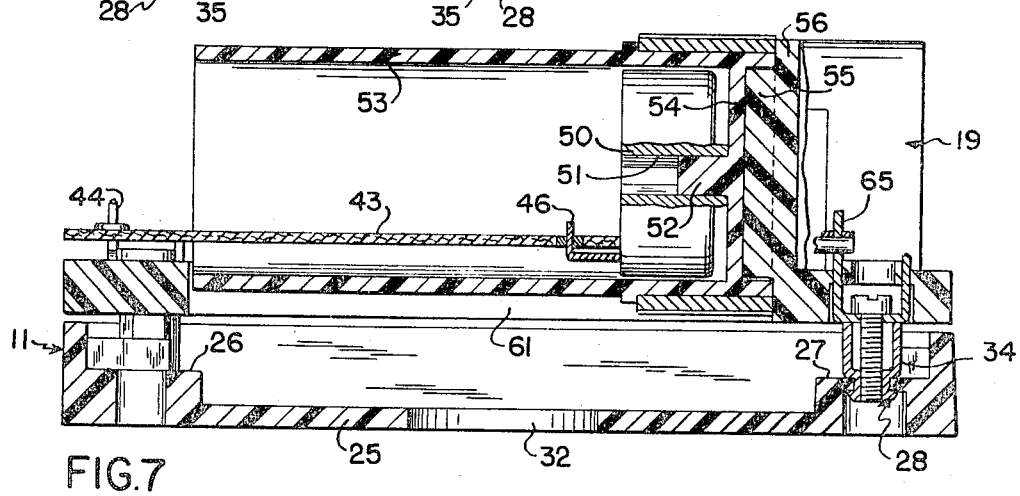
FIG. 7 is a sectional view taken substantially along line 7—7 of FIG. 2.

The potentiometer 40 is a conventional type having a drum shape housing and three L-shape terminals 46 extending from one face. The turned portions of the terminals 46 extend through three grommeted openings adjacent the outer end of the panel. The terminals 46 are soldered to the grommets through which they extend thereby effecting mechanical and electrical connections with the panel. The potentiometer 40 is supported on the panel with its axis extending longitudinally of the stem section of the panel, as shown in FIG. 7, for example. The grommets of the openings through the panel 43 provide convenient electrical connections between the potentiometer and other components of the control circuit through certain of the conductors 42 on the panel.

The potentiometer 40 includes a rotatable hub 50 which has a splined opening 51 therethrough for receiving a splined stub 52 on the adjusting member 20 for effecting rotation of the hub by the adjusting member. Rotation of the hub 50 changes the resistance offered by the potentiometer for varying the temperature response of the control circuit.

The adjusting member 20 is comprised of a cylindrical tube 53 which is preferably of a molded plastic material. The inside diameter of the tube 53 is such as to loosely receive the stem portion of the panel 43 and the potentiometer 40. The end of the tube 53 adjacent the potentiometer has an end wall 54 which is inset from the plane of the adjacent end of the tube. The wall 54 has the splined stub 52 projecting inwardly of the tube. The stub 52 is coaxial with the axis of the tube 53. In assembling the member 20 prior to attaching the panel to the frame 12, the open end of the tube 53 is advanced over the stem portion of the panel to install the potentiometer 40 and the stem of the panel within the tube. The stub shank 52 is telescoped inside the hub 50 for drivingly connecting the member 20 to the potentiometer hub. The panel 43 is then positioned on the frame 12 with the end recess formed by the wall 54 receiving a boss 55 formed on a support wall 56 on the frame 12. The broad end of the panel 43 is then brought to the frame 12 with the terminal prongs 44,45 projecting through the grommeted openings. The prongs 44,45 are then soldered to the grommets.

The portion of the frame 12 coextensive with the adjusting member 20 has recessed wall portions 61,62 and an aperture between the recessed wall portions to accommodate the cylindrical form of the adjusting member for free rotation. The member 20 is supported for rotation about its longitudinal axis by the bearings formed by the boss 55 and the shank 53 in the hub opening 51 of the potentiometer.

After the panel 43 with the adjusting member 20 has been assembled to the frame 12 as described, additional circuit connections may be made. In the form shown, the frame 12 includes terminal prongs 64,65 to which circuit wires 66,67 may be soldered, respectively. The wires 66,67 are suitably connected with the circuitry on the panel.

The frame 12 is mechanically and electrically connected to the base 11 by four screws 70,71,72,73. The screws 70-73 are received in openings through the frame 12 adjacent the corners thereof and are threaded into the bushings on the base 11. The shanks of the screws 70-73 extend through yoke sections of U-shape terminal members 74,75,76,77, respectively, attached to the frame 12, and the heads of the screws clamp the yokes of the terminal members to the projecting ends of the bushings.

The terminal members 74-77 are each formed of strips of conductors having the parallel legs extending through slot-like openings through the frame 12 at opposite sides of the openings for the screws 70-73. The terminal members 74-77 are secured in the openings through the frame by mashing side edge portions of the legs against the frame surface adjacent the end edges of the slots. The terminal prongs 44,45,64,65 extend from one leg of the respective terminal members 74-77. When the frame 12 is secured to the base 11 by the screws 70-73, the yokes of the terminal members 74-77 will be clamped to the outer ends of the respective terminal bushings 34 of the four terminal post assemblies 28 on the base.

The thermometer 19 is attached to the frame in a suitable manner. The thermometer is of conventional form and in the embodiment shown, it has a drum shape temperature scale 80 and a pointer 81 arranged to be moved by a bimetal element, not shown, so as to indicate the ambient temperature on the scale. A transparent shield 82 encloses the thermometer. Because the details of the thermometer 19 are not essential to an understanding of the invention they are not shown, nor is the manner in which the thermometer is attached to the frame.

After the frame 12 has been attached to the base 11 by the screws 70-73, the cover 13 is positioned on the frame as shown in FIG. 1. The cover 13 is held to the frame by lugs 84,85,86,87 formed on the sides of the frame 12. The lugs 84-87 engage an inwardly projecting flange around the inside of the open sides of the cover. The sides of the cover are slightly flexible so that the lugs can pass by the flanges. Further, the cover can be secured by a screw, not shown, extended through an opening in the bottom side wall and threaded into a lug 88 formed on the lower edge of the frame 12. The sides of the cover 13 have openings 90 for the circulation of air through the cover and into contact with the thermistor 41.

I claim:

1. A temperature sensing device including a generally elongated frame adapted to be supported on a wall or the like, a relatively narrow elongated panel, means attaching one end of said panel to one end of said frame whereby said panel is supported within the bounds of said frame in cantilever fashion, a potentiometer attached to the distal end of said panel, said potentiometer including a rotatable part for varying the resistance thereof, an adjusting member haVing a cylindrical wall section, means on said frame rotatably supporting said adjusting member adjacent said distal end of said panel with the axis of said cylindrical wall section thereof coaxial with the axis of said rotatable part, said panel and potentiometer substantially enclosed by said wall part, and slidably interlocking spline means drivingly connecting said adjusting member with said rotatable part.

* * * * *